US008764297B2

(12) United States Patent
Belser

(10) Patent No.: US 8,764,297 B2
(45) Date of Patent: Jul. 1, 2014

(54) ADJUSTABLE AXIAL PISTON MACHINES HAVING A BEARING SHELL FOR THE PIVOT CRADLE

(75) Inventor: Roland Belser, Haigerloch (DE)

(73) Assignee: Robert Bosch GmbH, Stuttgart (DE)

(*) Notice: Subject to any disclaimer, the term of this patent is extended or adjusted under 35 U.S.C. 154(b) by 122 days.

(21) Appl. No.: 13/498,864

(22) PCT Filed: Sep. 6, 2010

(86) PCT No.: PCT/EP2010/005463
§ 371 (c)(1),
(2), (4) Date: Jun. 4, 2012

(87) PCT Pub. No.: WO2011/042098
PCT Pub. Date: Apr. 14, 2011

(65) Prior Publication Data
US 2012/0230619 A1    Sep. 13, 2012

(30) Foreign Application Priority Data
Oct. 9, 2009  (DE) .......................... 10 2009 048 905

(51) Int. Cl.
*F16C 11/12*   (2006.01)
*F01D 25/16*   (2006.01)
*F16C 11/10*   (2006.01)

(52) U.S. Cl.
USPC ............................ 384/154; 384/129; 384/281

(58) Field of Classification Search
USPC ........ 384/2, 91, 129, 154, 276, 281, 451, 569
See application file for complete search history.

(56) References Cited

U.S. PATENT DOCUMENTS

| 5,390,584 | A | * | 2/1995 | Fritz et al. ....................... 92/12.2 |
| 5,630,352 | A | * | 5/1997 | Todd ............................... 92/12.2 |
| 6,027,250 | A | * | 2/2000 | Reubelt et al. ..................... 384/2 |
| 6,612,199 | B2 | * | 9/2003 | Cutshall et al. ................... 74/559 |
| 6,676,294 | B2 | | 1/2004 | Harimoto et al. |
| 7,172,394 | B2 | * | 2/2007 | Chung et al. ................... 417/449 |

(Continued)

FOREIGN PATENT DOCUMENTS

DE   102008013010 A1 *   9/2010   ................ F03C 1/06
DE   102010032649 A1 *   2/2012   ................ F04B 1/20

OTHER PUBLICATIONS

International Search Report corresponding to PCT Application No. PCT/EP2010/005463, mailed Dec. 15, 2010 (German and English language document) (5 pages).

*Primary Examiner* — Marcus Charles
(74) *Attorney, Agent, or Firm* — Maginot, Moore & Beck

(57) ABSTRACT

An adjustable axial piston machine includes a housing, a pivot cradle and a bearing shell which is arranged between the housing and the pivot cradle. The bearing shell includes a bearing section in the shape of an annular section with an inner end and a bearing shell end region which extends in one plane with an outer end. A bearing surface, the geometry of which corresponds to the bearing section, is provided on the housing. An outer supporting force point at the outer end and an inner supporting force point at the inner end lie on a straight line which extends on the inner supporting force point tangentially with respect to the bearing section. If a force is present in the circumferential direction of the bearing section, the inner supporting force point and the outer supporting force point are subjected to a supporting force substantially parallel to the straight line.

10 Claims, 3 Drawing Sheets

(56) References Cited

U.S. PATENT DOCUMENTS

| | | | |
|---|---|---|---|
| 7,517,156 B2 * | 4/2009 | Kazama | 384/569 |
| 7,793,582 B2 * | 9/2010 | Becker et al. | 92/12.2 |
| 2002/0136475 A1 | 9/2002 | Harimoto et al. | |

* cited by examiner

ADJUSTABLE AXIAL PISTON MACHINES HAVING A BEARING SHELL FOR THE PIVOT CRADLE

This application is a 35 U.S.C. §371 National Stage Application of PCT/EP2010/005463, filed on Sep. 6, 2010, which claims the benefit of priority to Serial No. DE 10 2009 048 905.3, filed on Oct. 9, 2009 in Germany, the disclosures of which are incorporated herein by reference in their entirety.

BACKGROUND

The disclosure relates to an adjustable axial piston machine.

U.S. Pat. No. 6,676,294 B2 presents a plurality of systems for mounting a pivot cradle of an adjustable axial piston machine in a housing by means of a bearing shell which is arranged in the housing and has an annular-section-shaped main section and at least one support region. A bearing shell is shown from which a protrusion with a radial component projects out of the outer surface of the annular-section-shaped main section in order to support circumferential forces.

The radial component leads, owing to the lever which is present as a result thereof, to a bending torque if forces act on the bearing shell in the circumferential direction.

These bending torques lead to considerable loading and can also lead to the failure of the bearing shell and therefore to the breakdown of the machine.

An object of the disclosure therefore consists in providing an adjustable axial piston machine which has a bearing of the pivot cradle which is improved with respect to operational reliability and can be implemented, in particular, in an economical fashion in terms of the material and costs and with low expenditure.

The object is achieved with the adjustable axial piston machine as described herein.

SUMMARY

The adjustable axial piston machine according to the disclosure has a housing, a pivot cradle and a bearing shell which is arranged between the housing and the pivot cradle.

The bearing shell comprises an annular-section-shaped bearing section and at least one bearing shell end region which extends in a plane and has an inner end and an outer end. The inner end is formed by the junction of the bearing section with the bearing shell region. A bearing surface, which corresponds in its geometry to the bearing section, is provided on the housing. An outer supporting force point at the outer end, and an inner supporting force point at the inner end, of the bearing shell end region lie here on a straight line which extends tangentially to the annular-section-shaped bearing section at the inner supporting force point. The inner supporting force point and the outer supporting force point are subjected here to a supporting force which acts parallel to the straight line when a force is present in the circumferential direction of the bearing section.

As a result of the fact that the bearing shell end region extends along a plane, supporting forces can be transmitted without in the process loading the bearing shell end region with bending torques. The stability of the bearing shell end region and of the entire bearing shell are then increased.

By virtue of the fact that an outer supporting force point lies at the outer end and an inner supporting force point lies at the inner end of the bearing shell end region on a straight line which extends tangentially to the annular-section-shaped bearing section at the inner supporting force point, supporting forces can be transmitted from the outer supporting force point to the inner supporting force point in such a way that damaging bending torques do not occur either in the bearing shell end region or in the bearing section. The service life of the bearing shell is then prolonged, and in particular an interruption in operation is counteracted.

Advantageous developments of the adjustable axial piston machine according to the invention disclosure are described herein.

When a force is present in the circumferential direction of the bearing section, the bearing shell is preferably supported on the housing by means of the outer supporting force point. As a result, the bearing shell is secured in a positively locking fashion and is impossible with respect to rotation in the circumferential direction.

The outer supporting force point is preferably arranged on a bearing shell support surface of the bearing shell. By virtue of the formation of the bearing shell support surface, the support can take place by means of a surface. The pressure over surface area is thus reduced.

A housing support surface is preferably correspondingly formed in the housing, the outer supporting force point being supported on said housing support surface.

In this context, the bearing shell support surface is supported on the housing, in particular on a housing support surface which is formed parallel to the bearing shell support surface. In this case, the support is implemented in a particularly easy way without an intermediate element adapting the geometries.

The housing support surface and the bearing shell support surface are preferably formed perpendicularly to the straight line, on which the two supporting force points lie. This avoids a situation in which the support surfaces slip relative to one another during the support.

The bearing shell end region is preferably narrower than the bearing section with respect to an annular axis of the annular-section-shaped bearing section. The bearing shell end region can therefore also carry out its function with little expenditure in terms of space and materials. The secure and reliable mounting of the pivot cradle is then also lightweight and economical in terms of space.

The bearing shell is preferably formed mirror-symmetrically with respect to a plane extending through an annular axis of the annular-section-shaped bearing section. This permits the bearing shell to be reliably secured against movements in both circumferential directions.

The bearing section and the bearing shell end region are preferably arranged along a common outer edge lying in a plane. This makes the bearing shell easy to manufacture and permits it to be accommodated in a stable fashion in an interior space of the housing. Despite a large bearing surface in the region of the bearing section it is possible to achieve a saving in terms of installation space, in particular if the bearing shell end regions are narrower. This results in a large useable inner width.

The housing support surface lying opposite the bearing shell support surface is preferably formed on a latching projection. This permits the bearing shell to be secured in the housing in an uncomplicated and particularly reliable way. In addition to insertion along the annular axis, it is also possible to perform latching in by pushing the bearing shell in parallel to a drive shaft axis if the elasticity of the bearing shell permits reversible deformation.

The latching projection preferably has for this purpose a ramp facing away from the housing support surface as an insertion slope. This particularly simplifies the installation of the bearing shell in the housing.

BRIEF DESCRIPTION OF THE DRAWINGS

A preferred embodiment of the disclosure will be explained in more detail with reference to the drawing in the following description, in which drawing.

DETAILED DESCRIPTION

Figure 1:
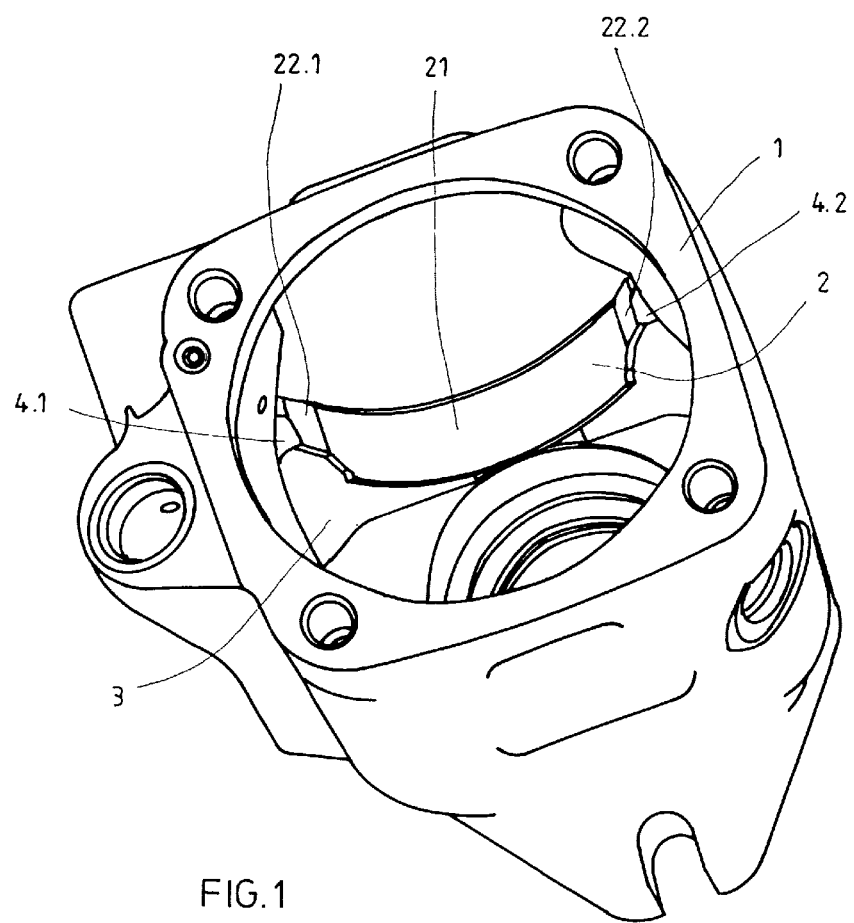
FIG. 1 shows a perspective view of a housing of an adjustable axial piston machine according to the disclosure with a fitted-on bearing shell.

FIG. 1 shows a perspective view of a housing 1 of an adjustable axial piston machine according to the disclosure. A bearing shell 2 is arranged in an interior space 3 in the housing 1. A pivot cradle is not shown for the sake of clarity. However, the pivot cradle is supported in a known fashion on the housing 1 by means of the bearing shell 2. The bearing shell 2 has for this purpose an annular-section-shaped bearing section 21, a straight first bearing shell end region 22.1 extending in a plane and a straight second bearing shell end region 22.2 also extending in a plane. When a circumferential force occurs in the bearing section 21 the first bearing shell end region 22.1 is supported on a first latching projection 4.1 which is formed on the housing. When a circumferential force occurs in the bearing section 21, the second bearing shell end region 22.2 is supported on a second latching projection 4.2, which is also formed on the housing. The bearing section 21 which is illustrated extends between the two bearing shell end regions 22.1, 22.2. The junction with these bearing shell end regions 22.1, 22.2 is marked by the dotted lines in FIG. 1 and is supported, in the direction of its outer side on the housing 1, in the interior space 3 with respect to radial forces which are transmitted through the pivot cradle. The interior space 3 is for this purpose formed at least in this region in a way which is complementary to the bearing section 21; i.e. it is also formed in the shape of an annular section.

Figure 2:
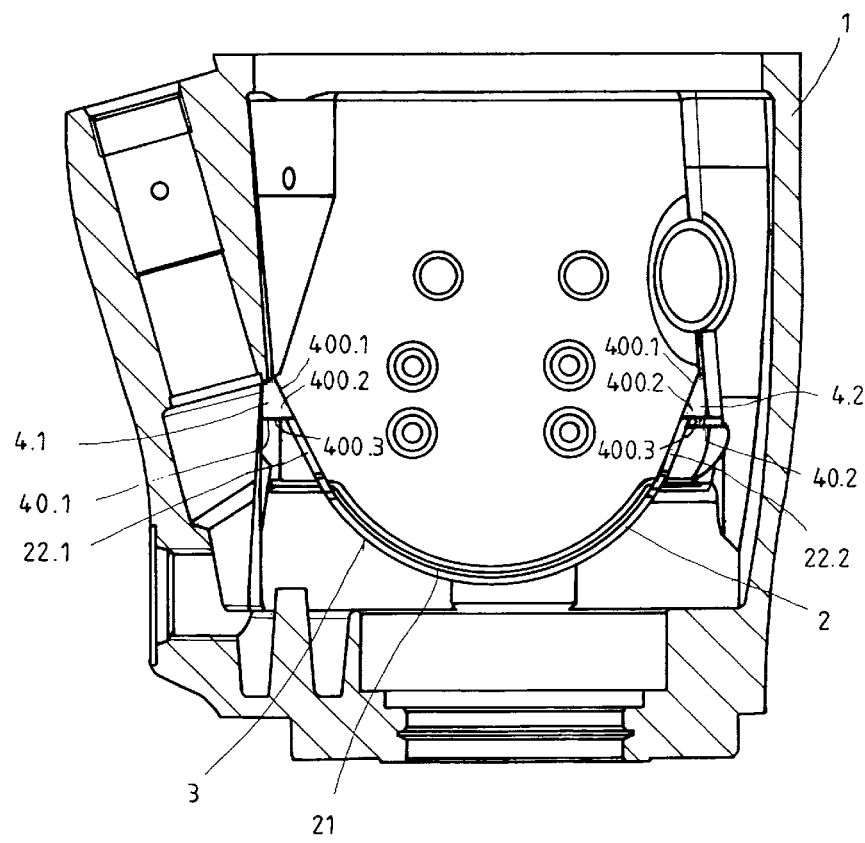
FIG. 2 shows a section through the housing of the adjustable axial piston machine according to the disclosure with a bearing shell fitted on according to FIG. 1.

FIG. 2 shows a section through the housing 1 with the fitted-on bearing shell 2 according to FIG. 1. The first bearing shell end region 22.1 is supported on a first housing support surface 40.1 of the first latching projection 4.1. The second bearing shell end region 22.2 is supported on a first housing support surface 40.2 of the second latching projection 4.2. As a result, bearing surfaces 40.1 and 40.2, respectively, which correspond in their geometry to the bearing shell or to the bearing shell end regions 22.1 and 22.2, respectively, are provided on the housing 1. The first latching projection 4.1 and the second latching projection 4.2 each have a ramp 400.1, a latching projection tip 400.2 and a latching projection underside 400.3, which forms the corresponding housing support surface 40.1 (or 40.2, respectively).

Figures 3A, 3B:
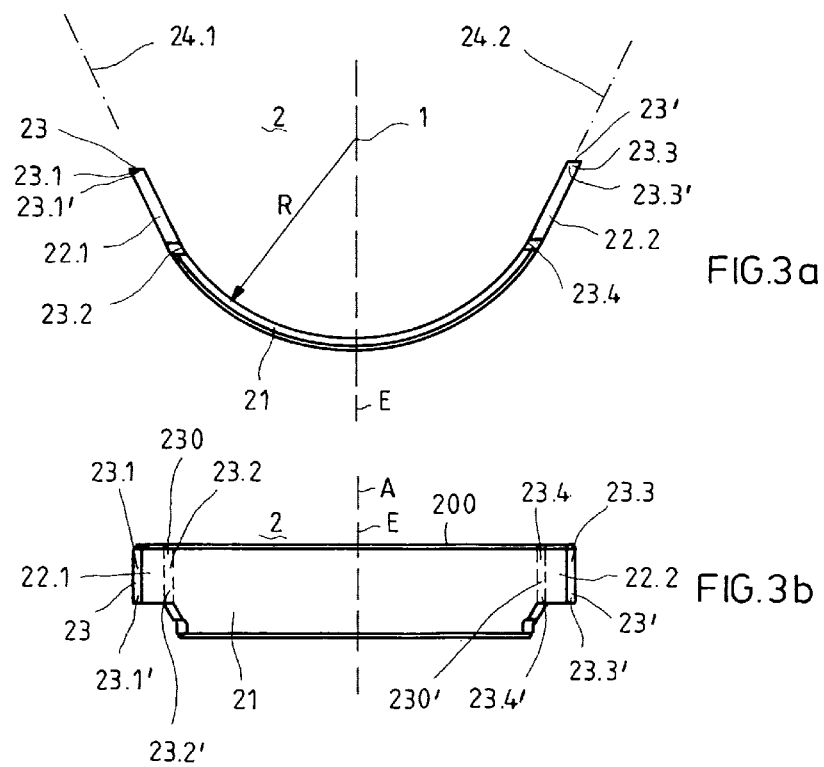
FIG. 3A and FIG. 3B show a bearing shell according to FIG. 1.

FIGS. 3A and 3B each show the bearing shell 2. The bearing shell 2 has, apart from the bearing section 21, the first bearing shell end region 22.1 with a first outer end 23 facing away from the bearing section 21, and the second bearing shell end region 22.2 with a second outer end 23' also facing away from the bearing section 21.

Formed on the first outer end 23 is a first bearing shell support surface 23.1' with which the first bearing shell end region 22.1 is supported against the first latching projection 4.1 when there is a circumferential force acting in this direction in the bearing section 21. In the first bearing shell support surface 23.1' at least one first outer supporting force point 23.1 is formed for this purpose, which outer supporting force point 23.1 is also supported against the first latching projection 4.1 and the first housing support surface 40.1 when there is a circumferential force in the bearing section 21. In order to reduce the pressure over a surface area, the support is preferably provided over a surface.

A second bearing shell support surface 23.3', with which the second bearing shell end region 22.2 supported against the second latching projection 4.2 when there is a correspondingly directed circumferential force in the bearing section 21, is formed in an analogous fashion on the second outer end 23'. In the second bearing shell support surface 23.3' there is at least one second outer supporting force point 23.3 which is also supported against the second latching protection 4.2 and the second housing support surface 40.2 when there is a corresponding circumferential force in the bearing section 21.

The bearing section 21 and the bearing shell end regions 22.1 and 22.2, respectively, follow one another in the circumferential direction (in a first circumferential direction (in the clockwise direction in FIG. 3A) or in a second circumferential direction (in a counterclockwise direction in FIG. 3A)). A first inner end 230 and a second inner end 230' are respectively formed on the interface between the bearing section 21 and the first bearing shell end region 22.1 (or 22.2), on which inner end 230, a first inner supporting force point 23.2 and a second inner supporting force point 23.4 lie. The outer supporting force point 23.1 (or 23.3, respectively) is supported on the housing 1 when there is a corresponding circumferential force present in the bearing section 21. The inner supporting force point 23.2 (or 23.4, respectively transmits the force between the respective bearing shell end region and the bearing section 21 when a corresponding circumferential force is present on the bearing section 21 on the bearing shell end region 22.1 (or 22.2, respectively). The outer supporting force point 23.1 (or 23.3, respectively) at the outer end 23 (or 23', respectively) and the inner supporting force point 23.2 (or 23.4, respectively) at the inner end 23.2' (or 23.4', respectively) lie in a first straight line 24.1 (or a second straight line 24.2, respectively) which extends tangentially to the bearing section 21 at the inner supporting force point 23.2 (or 23.4, respectively). The inner supporting force point 23.2 (or 23.4, respectively) and the outer supporting force point 23.1 (or 23.3, respectively) are thereby subjected to a supporting force parallel to the straight line 24.1 (or 24.2, respectively) when a corresponding circumferential force is present.

In a modified exemplary embodiment (not illustrated) with otherwise identical features, the housing support surface 40.1 (or 40.2, respectively) and the facing bearing shell support surface 23.1' (or 23.3', respectively,) are arranged parallel to one another and preferably perpendicularly to the straight line 24.1 (or 24.2, respectively). The bearing shell support surface 23.1' (or 23.3', respectively) and therefore the outer supporting force point 23.1 (or 23.3, respectively) are also both supported on the housing 1 on the housing support surface 40.1 (or 40.2, respectively) in this example.

During operation of the system according to the disclosure and its variations, the inner supporting force point 23.2 (or 23.4, respectively) and the outer supporting force point 23.1 (or 23.3, respectively) are subjected here to a supporting force at least essentially parallel to the straight line 24.1 (or 24.2, respectively).

In the illustrated exemplary embodiment, the bearing shell end region 22.1 (or 22.2, respectively) is narrower in the axial direction—with respect to the annular axis A of the annular bearing section 21—than the bearing section 21. The first bearing shell end region 22.1, the bearing section 21 and the second bearing shell end region 22.2 are arranged along a common outer edge 200 lying in a plane perpendicular to the annular axis A, which outer edge 200 is directed to the outer side of the housing 1. The common outer edge 200 cannot be seen in FIG. 2 since it is located behind the illustrated bearing shell 2 with respect to the plane of the drawing.

The first latching projection 4.1 and the second latching projection 4.2 and therefore also the ramp 400.1, the latching projection tip 400.2 and the latching projection underside 400.3 of each latching projection 4.1 and 4.2 and the corresponding housing support surfaces 40.1 and 40.2 have an identical common width. This common width is smaller in the illustrated exemplary embodiment than the extent of the bearing shell end regions 22.1 and 22.2 in the axial direction with respect to the annular axis A. The latching projections 4.1, 4.2 are arranged centrally with respect to the width of the bearing section 21. Torques are there avoided. The ramp 400.1 is formed as an insertion slope on which the bearing shell 2 can slide into the illustrated position when the bearing shell 2 is inserted into the interior space 3.

When the bearing shell 2 is placed in the position illustrated in FIGS. 1 and 2, various methods can be used. In accordance with a first method, the bearing shell 2 is inserted from above, with respect to FIG. 2. The bearing shell 2 is moved, in the illustrated orientation, from above in the direction of the interior space 3. The bearing shell end regions 22.1, 22.1 are first supported against the ramps 400.1, 400.2 in a way which elastically deforms the bearing shell 2, before said bearing shell end regions 22.1, 22.1 subsequently latch in under the latching projections 4.1, 4.2 in a way which destresses the bearing shell 2 again.

In accordance with a second method, the bearing shell 2 is also inserted from above, likewise with respect to FIG. 2. However, the bearing shell 2 is then moved from above past the latching projections 4.1 and 4.2 in the direction of the interior space 3, and when the depth of the end position is reached it is pushed perpendicularly to the plane of the drawing into the plane of the drawing and under the latching projections 4.1 and 4.2.

According to a third mounting method, the bearing shell 2 can also initially be formed without the planar bearing shell end regions 22.1 and 22.2. Said bearing shell 2 then extends along a circular line in the lateral view in FIG. 3A. As a result, it can be inserted past the latching projections 4.1, 4.2 without elastic deformation. After this, the bearing shell end regions 22.1 and 23.1 are then deformed plastically by widening until the planar bearing shell end regions 22.1 and 22.2 are reached. These are then moved under the latching projections 4.1 and 4.2 by deformation.

The bearing shell 2 is formed perpendicularly to the plane of the drawing in FIGS. 3A and 3B, in a mirror-symmetrical fashion with respect to a plane E which extends through and is divided by the annular axis A.

A further bearing shell 2 in the housing is arranged in the housing 1 in a way which is mirror-symmetrical with respect to the plane of the drawing in FIG. 2. The two outer edges 200 point away from one another with respect to the annular axis A. The further bearing shell is arranged in the housing 1 in an analogous way to the bearing shell 2 described. A secure mount of the pivot cradle is implemented by means of the bearing shells 2 which are arranged and secured in this way.

Instead of a latching projection 4.1 (or 4.2, respectively) with the housing support surface 40.1 (or 40.2, respectively), for example a housing bulge, a housing recess or, for example, an element which is secured in a positively and/or frictionally locking fashion by the housing and can be inserted separately can be used to form the housing support surface 40.1 (or 40.2).

The disclosure is not restricted to the exemplary embodiments illustrated. Instead, individual features of the exemplary embodiments can also be advantageously combined with one another.

The invention claimed is:

1. An adjustable axial piston machine comprising:
   a housing; and
   a bearing shell which is arranged on the housing and has an annular-section-shaped bearing section with an inner end and at least one bearing shell region which extends in a plane and has an outer end,
   wherein a bearing surface which corresponds in its geometry to the bearing section is provided on the housing,
   wherein an outer supporting force point lies at the outer end, and an inner supporting force point lies at the inner end of the bearing shell end region on a straight line which extends tangentially to the bearing section at the inner supporting force point, and
   wherein the inner supporting force point and the outer supporting force point are subjected to a supporting force essentially parallel to the straight line when a force is present in the circumferential direction of the bearing section and wherein when a force is present in the circumferential direction of the bearing section, the bearing shell is supported on the housing by means of the outer supporting force point.

2. The axial piston machine as claimed in claim 1, wherein the outer supporting force point is arranged on a bearing shell support surface.

3. The axial piston machine as claimed in claim 1, wherein a housing support surface is formed in the housing, the outer supporting force point being supported on the housing support surface.

4. The axial piston machine as claimed in claim 3, wherein a bearing shell support surface is supported on the housing on the housing support surface which is formed parallel to the bearing shell support surface.

5. The axial piston machine as claimed in claim 3, wherein the housing support surface and a bearing shell support surface are formed perpendicularly to the straight line.

6. The axial piston machine as claimed in claim 1, wherein the bearing shell end region is narrower in the axial direction than the bearing section.

7. The axial piston machine as claimed in claim 1, wherein the bearing shell is formed minor-symmetrically with respect to a plane extending through an annular axis of the annular-section-shaped bearing section.

8. The axial piston machine as claimed in claim 1, wherein the bearing section and the bearing shell end region are arranged along a common straight outer edge lying in a plane.

9. The axial piston machine as claimed in claim 1, wherein a housing support surface lying opposite the bearing shell support surface is formed on a latching projection in the housing.

10. The axial piston machine as claimed in claim 9, wherein the latching projection has a ramp as an insertion slope.

* * * * *

UNITED STATES PATENT AND TRADEMARK OFFICE
CERTIFICATE OF CORRECTION

| | | |
|---|---|---|
| PATENT NO. | : 8,764,297 B2 | Page 1 of 1 |
| APPLICATION NO. | : 13/498864 | |
| DATED | : July 1, 2014 | |
| INVENTOR(S) | : Roland Belser | |

It is certified that error appears in the above-identified patent and that said Letters Patent is hereby corrected as shown below:

On the title page item (54) and in the specification column 1, line 1, in the Title, delete the word "MACHINES" and insert the word --MACHINE-- in its place.

In the claims

In column 6, line 50, claim 7, delete the word "minor-symmetrically" and insert the word --mirror-symmetrically-- in its place.

Signed and Sealed this
Twenty-fourth Day of May, 2016

Michelle K. Lee
*Director of the United States Patent and Trademark Office*